US008830588B1

(12) United States Patent
Brown et al.

(10) Patent No.: US 8,830,588 B1
(45) Date of Patent: Sep. 9, 2014

(54) REFLECTOR AND COVER GLASS FOR SUBSTRATE GUIDED HUD

(75) Inventors: Robert D. Brown, Lake Oswego, OR (US); Kurt A. Stahl, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 180 days.

(21) Appl. No.: 13/432,731

(22) Filed: Mar. 28, 2012

(51) Int. Cl.
G02B 27/14 (2006.01)
G02B 27/01 (2006.01)

(52) U.S. Cl.
CPC .................................. *G02B 27/0172* (2013.01)
USPC ........................................... 359/630; 359/633

(58) Field of Classification Search
USPC ........................................ 359/630, 629, 633
See application file for complete search history.

(56) References Cited

U.S. PATENT DOCUMENTS

| | | | |
|---|---|---|---|
| 2,141,884 A | 12/1938 | Sonnefeld | |
| 4,082,432 A | 4/1978 | Kirschner | |
| 4,178,074 A | 12/1979 | Heller | |
| 4,218,111 A | 8/1980 | Withrington et al. | |
| 4,232,943 A | 11/1980 | Rogers | |
| 4,309,070 A | 1/1982 | St. Leger Searle | |
| 4,711,512 A | 12/1987 | Upatnieks | |
| 4,775,218 A | 10/1988 | Wood et al. | |
| 5,341,230 A | 8/1994 | Smith | |
| 5,408,346 A | 4/1995 | Trissel et al. | |
| 5,903,395 A | 5/1999 | Rallison et al. | |
| 6,169,613 B1 | 1/2001 | Amitai et al. | |
| 6,392,812 B1 | 5/2002 | Howard | |
| 6,646,810 B2 | 11/2003 | Harter et al. | |
| 6,757,105 B2 | 6/2004 | Niv et al. | |
| 6,829,095 B2 | 12/2004 | Amitai | |
| 6,847,488 B2 | 1/2005 | Travis | |
| 7,021,777 B2 | 4/2006 | Amitai | |
| 7,123,418 B2 | 10/2006 | Weber et al. | |
| 7,205,960 B2 | 4/2007 | David | |
| 7,319,573 B2 | 1/2008 | Nishiyama | |
| 7,391,573 B2 | 6/2008 | Amitai | |
| 7,457,040 B2 | 11/2008 | Amitai | |
| 7,573,640 B2 | 8/2009 | Nivon et al. | |
| 7,576,916 B2 | 8/2009 | Amitai | |
| 7,577,326 B2 | 8/2009 | Amitai | |
| 7,643,214 B2 | 1/2010 | Amitai | |

(Continued)

FOREIGN PATENT DOCUMENTS

WO WO-2011/012825 2/2011

OTHER PUBLICATIONS

Cameron, A., The Application of Holographic Optical Waveguide Technology to Q-Sight™ Family of Helmet Mounted Displays, Proc. of SPIE, 2009, 11 pages, vol. 7326.

(Continued)

*Primary Examiner* — Jack Dinh
(74) *Attorney, Agent, or Firm* — Donna P. Suchy; Daniel M. Barbieri

(57) ABSTRACT

A display (for example, a head up display (HUD)) includes a substrate waveguide. The substrate waveguide can act as a combiner. The substrate waveguide receives collimated light an input and provides the collimated light to an output. The collimated light travels from the input to the output within the substrate waveguide by total internal reflection. An input diffraction grating is disposed in the first area at the input and an output diffraction grating is disposed in the second area at the output. A plate covers at least a portion of the second area. The plate can protect the diffraction grating and reflect transmitted order light from the diffraction grating to improve efficiency.

20 Claims, 2 Drawing Sheets

(56) References Cited

U.S. PATENT DOCUMENTS

| | | |
|---|---|---|
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,751,122 B2 | 7/2010 | Amitai |
| 7,884,985 B2 | 2/2011 | Amitai et al. |
| 7,907,342 B2 | 3/2011 | Simmonds et al. |
| 8,089,568 B1 | 1/2012 | Brown et al. |
| 8,213,065 B2 | 7/2012 | Mukawa |
| 8,233,204 B1 | 7/2012 | Robbins et al. |
| 2006/0132914 A1 | 6/2006 | Weiss et al. |
| 2007/0019297 A1 | 1/2007 | Stewart et al. |
| 2008/0043334 A1 | 2/2008 | Itzkovitch et al. |
| 2008/0106775 A1 | 5/2008 | Amitai et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2009/0019222 A1 | 1/2009 | Verma et al. |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0128911 A1 | 5/2009 | Itzkovitch et al. |
| 2009/0153437 A1 | 6/2009 | Aharoni |
| 2009/0237804 A1 | 9/2009 | Amitai et al. |
| 2010/0171680 A1 | 7/2010 | Lapidot et al. |
| 2010/0246004 A1 | 9/2010 | Simmonds |
| 2010/0246993 A1 | 9/2010 | Rieger et al. |
| 2011/0026128 A1 | 2/2011 | Baker et al. |
| 2011/0050548 A1 | 3/2011 | Blumenfeld et al. |
| 2012/0127577 A1 | 5/2012 | Desserouer |

OTHER PUBLICATIONS

Wisely, P.L., Head up and head mounted display performance improvements through advanced techniques in the manipulation of light, Proc. of SPIE, 2009, 10 pages, vol. 7327.

Office Action for U.S. Appl. No. 13/250,621, mail date May 21, 2013, 10 pages.

Office Action for U.S. Appl. No. 13/250,940, mail date Aug. 28, 2013, 15 pages.

Office Action for U.S. Appl. No. 13/250,940, mail date Mar. 12, 2013, 11 pages.

Office Action for U.S. Appl. No. 13/250,970, mail date Jul. 30, 2013, 4 pages.

Office Action for U.S. Appl. No. 13/250,994, mail date Sep. 16, 2013, 11 pages.

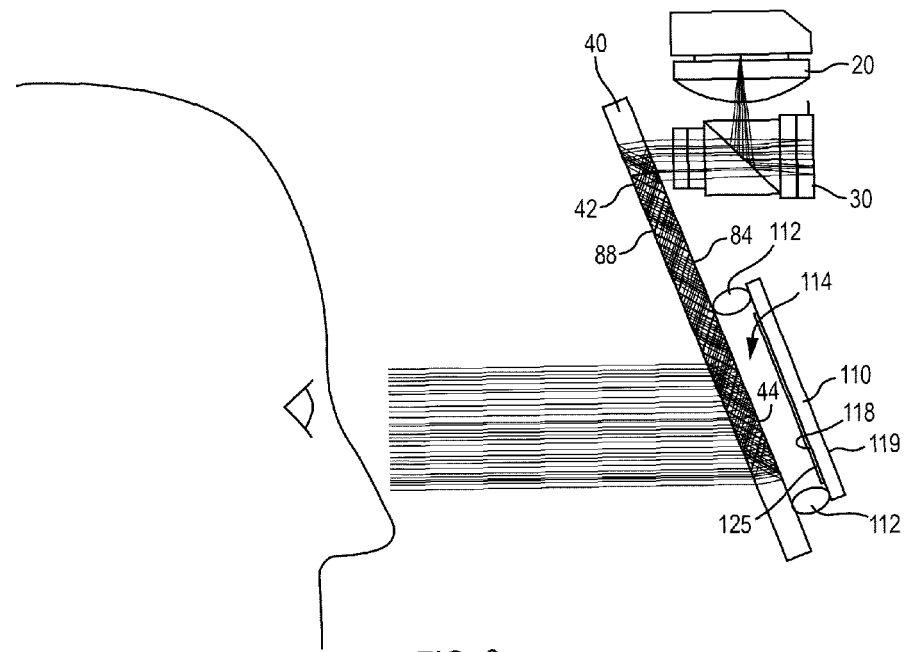
FIG. 3
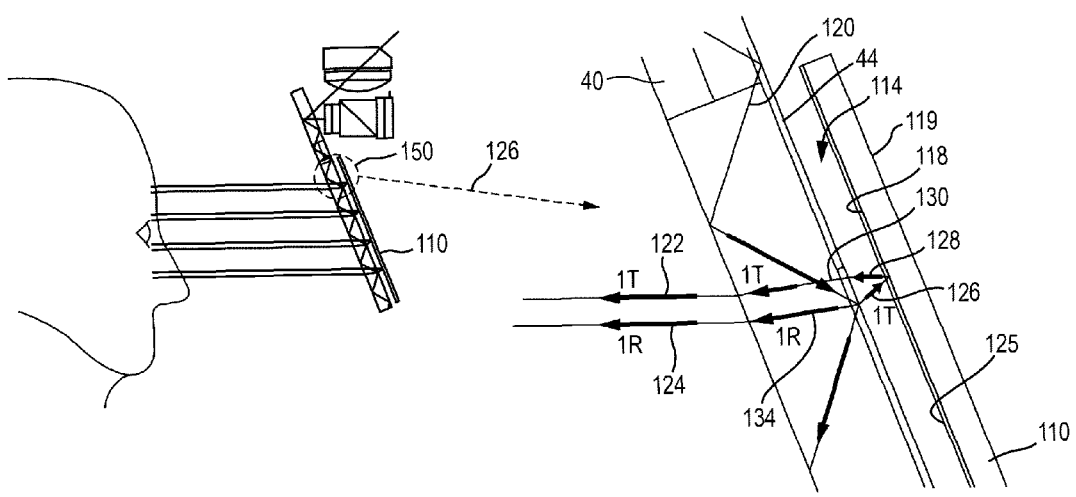
FIG. 4
FIG. 5

REFLECTOR AND COVER GLASS FOR SUBSTRATE GUIDED HUD

CROSS REFERENCE TO RELATED APPLICATIONS

The present application is related to: U.S. patent application Ser. No. 13/250,621 filed on Sep. 30, 2011 entitled "System For And Method of Catadioptric Collimation In A Compact Head Up Display (HUD)", incorporated herein by reference in its entirety and assigned to the assignee of the present application; "U.S. patent application Ser. No. 13/250,940, entitled, "Head Up Display (HUD) Utilizing Diffractive Gratings Having Optimized Efficiency," filed on Sep. 30, 2011, incorporated herein by reference in its entirety, and assigned to the assignee of the present application; U.S. patent application Ser. No. 13/250,858, entitled, "Ultra-Compact HUD Utilizing Waveguide Pupil Expander With Surface Relief Gratings In High Refractive Index Materials," filed on Sep. 30, 2011, incorporated herein by reference in its entirety, and assigned to the assignee of the present application; U.S. patent application Ser. No. 13/251,087, entitled, "System for and Method of Extending Vertical Field of View in Head Up Display Utilizing a Waveguide Combiner," filed on Sep. 30, 2011, incorporated herein by reference in its entirety, and assigned to the assignee of the present application; U.S. patent application Ser. No. 13/250,970, entitled, "System For and Method of Stowing HUD Combiners," filed on Sep. 30, 2011 and assigned to the assignee of the present application, incorporated herein by reference in its entirety; and U.S. patent application Ser. No. 13/250,994, entitled, "Compact Head Up Display (HUD) for Cockpits with Constrained Space Envelopes," filed on Sep. 30, 2011, incorporated herein by reference herein in its entirety and assigned to the assignee of the present application. The present application is also related to U.S. application Ser. No. 13/432,662, entitled "System For and Method of Displaying Information Without Need For a Combiner Alignment Detector" filed on Mar. 28, 2012, incorporated herein by reference herein in its entirety and assigned to the assignee of the present application.

BACKGROUND OF THE INVENTION

The present specification relates to displays, such as, head up displays (HUDs). More particularly, the present specification relates to displays with increased optical efficiency.

Displays, such as HUDs, can be used in a variety of applications. In aircraft applications, HUDs can provide significant safety and operational benefits including precise energy management and conformal flight paths. These safety and operational benefits are enjoyed by operators of air transport aircraft, military aircraft, regional aircraft and high end business jets where HUDs are generally employed. These safety and operational benefits are also desirable in smaller aircraft.

Substrate guided HUDs have been proposed which use waveguide technology with diffraction gratings to preserve eye box size while reducing lens size. U.S. Pat. No. 4,309,070 issued to St. Leger Searle and U.S. Pat. No. 4,711,572 issued to Upatnieks disclose substrate guided HUDs. However, such systems have faced difficulties in design.

Substrate guided HUDs have been proposed which provide pupil expansion using transparent diffraction gratings for in-coupling light from collimating optics and out-coupling light to the pilot at the output of the waveguide. The light directed toward the pilot is diffracted in a reflective manner by the out-coupling diffraction grating. However, a considerable amount of diffracted light is also transmitted through the out-coupling diffraction grating in a direction that it is opposite to the desired direction toward the pilot. This transmission of diffracted light through the diffraction grating in a direction that it is opposite to the desired direction lowers the optical efficiency of the HUD.

In addition, the diffraction gratings employed by substrate guided HUDs can be fragile and delicate. Diffraction gratings can be damaged by debris or improper handling.

Thus, there is a need to protect the output diffraction grating in a substrate guided HUD. Further, there is a need for increasing the optical efficiency of a substrate guided HUD. Still further, there is a need for a HUD including a substrate waveguide configured for pupil expansion with acceptable optical characteristics. Yet further, there is a need for a HUD with pupil expansion which enables a wide field of view and acceptable luminance. Further still, there is a need for a low cost HUD including diffraction gratings that meet performance and cost requirements. Yet further still, there is a need for a compact HUD which uses a configuration optimized for protection of at least one diffraction grating and optical efficiency. Yet further still, there is also a need for a small volume, lightweight, lower cost HUD with superior optical efficiency.

SUMMARY OF THE INVENTION

An exemplary embodiment relates to a head up display. The head up display includes a substrate waveguide. The substrate waveguide acts as a combiner and receives collimated light at an input and provides the collimated light to an output. Collimated light travels from the input to the output within the substrate waveguide by total internal reflection. An input diffraction grating is disposed in a first area at the input and an output diffraction grating is disposed in a second area at the output. The head up display also includes a plate covering at least a portion of the second area.

Another embodiment relates to a method of providing information to a user. The method includes providing light from an image source to a collimator. The method also includes providing the light from the collimator to a combiner. The light travels from an input of the combiner to an output of a combiner by total internal reflection. An input diffraction grating is disposed in a first area at the input and an output diffraction grating is disposed in a second area at the output. The method also includes reflecting light transmitted through the output diffraction grating. The light is reflected through the substrate waveguide toward the user.

Another exemplary embodiment relates to a display for an image. The display includes an image source, collimating optics, and a combiner. The collimating optics receive the image from the image source. The combiner receives collimated light from the collimating optics at an input and provides the collimated light at an output. The collimated light travels from the input to the output within the combiner by total internal reflection. An input diffraction grating is disposed at the input and an output diffraction grating is disposed at the output. The display also includes a means for the recovering transmitted order light from the output diffraction grating or the input diffraction grating and protecting the output diffraction grating or the input diffraction grating.

BRIEF DESCRIPTION OF THE DRAWINGS

Exemplary embodiments are hereafter described with reference to the accompanying drawings, wherein like numerals denote like elements; and:

FIG. 3 is a more detailed side view schematic drawing of the HUD system illustrated in FIG. 2 in accordance with an exemplary embodiment;

FIG. 4 is a more detailed side view drawing of the HUD system illustrated in FIG. 3 showing a transmitted order of light; and FIG. 5 is an enlarged side view of a portion of the waveguide illustrated in FIG. 4.

DETAILED DESCRIPTION OF THE PREFERRED EMBODIMENTS

Figure 1:
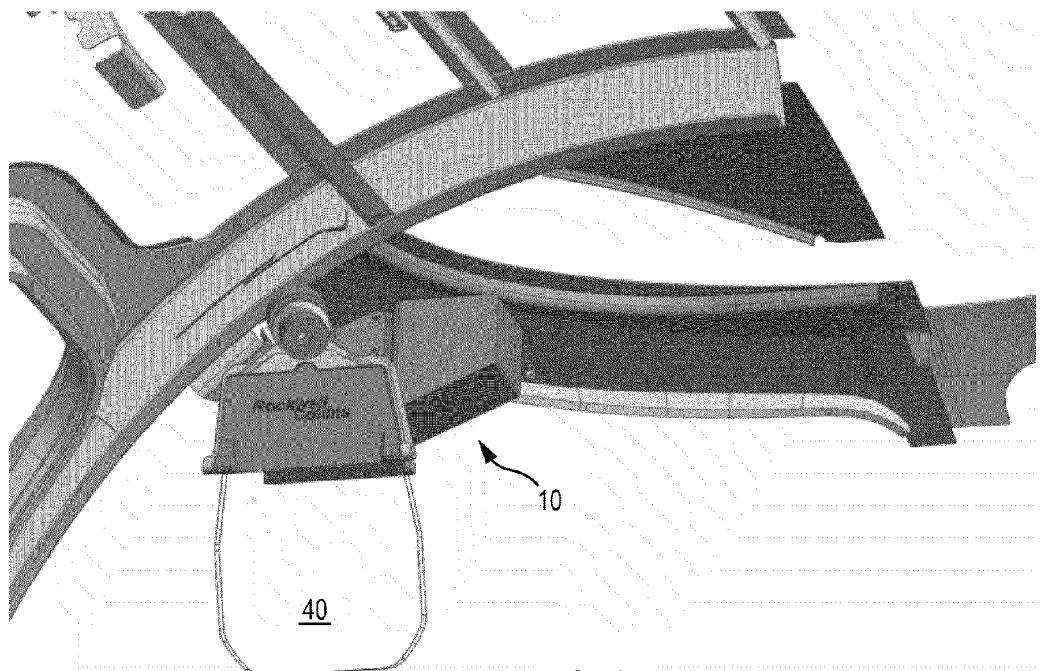
FIG. 1 is a perspective view schematic drawing of a head up display (HUD) system including a waveguide in accordance with an exemplary embodiment.

Before describing in detail the particular improved system and method, it should be observed that the invention includes, but is not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, a display, such as, a head up display (HUD) system 10, can be utilized in various applications, including aviation, medical, naval, targeting, ground based, military, etc. HUD system 10 can be configured for use in smaller cockpit environments and yet can provide an appropriate field of view and eye box for avionic applications in one embodiment.

Figure 2:
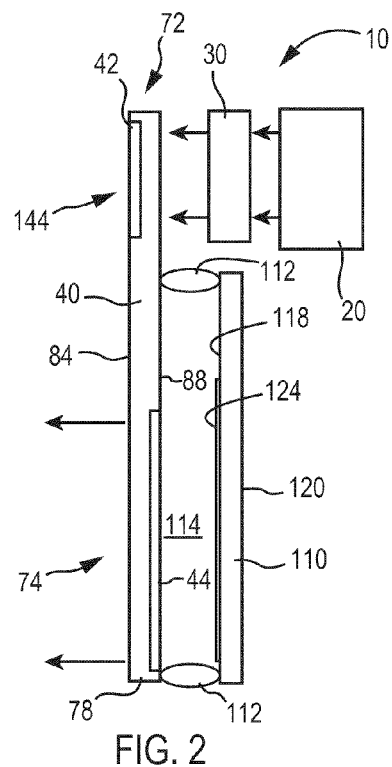
FIG. 2 is a general block diagram of the head up display (HUD) system illustrated in FIG. 1 for use in accordance with an exemplary embodiment.

With reference to FIGS. 2 and 3, an embodiment of HUD system 10 preferably includes an image source 20 and substrate waveguide 40. Image source 20 can be any device for providing an image including but not limited to a CRT display, an LED display, an active matrix liquid crystal display (LCD), etc. In one embodiment, image source 20 is a micro LCD assembly and can provide linearly polarized light. The micro LCD assembly can be back lit by an LED source or other source of light.

In addition, system 10 can include collimating optics 30 disposed between substrate waveguide 40 and image source 20. Collimating optics 30 can be a single optical component, such as a lens, or include multiple optical components. In one embodiment, collimating optics 30 are configured as a catadioptric collimator. However, system 10 can be utilized with a variety of collimating projectors and is not limited to any particular type of collimator. Collimating optics 30 can be any optical component or configuration of optical components that provide light (preferably collimated light) from image source 20 to substrate waveguide 40. Collimating optics 30 can be integrated with or spaced apart from image source 20 and/or substrate waveguide 40.

In operation, system 10 provides images from image source 20 to a pilot or other operator so that the pilot can simultaneously view the images and a real world scene. The images can include graphic and/or text information (e.g., symbols, flight path vector, etc.) related to avionic information in one embodiment. In addition, the images can include synthetic or enhanced vision images. In one embodiment, collimated light representing the image from image source 20 is provided on substrate waveguide 40 so that the pilot can view the image conformally on the real world scene through substrate waveguide 40. Waveguide 40 is transparent for viewing the real world scene through main surfaces or sides 84 and 88 and operates as a combiner in one embodiment.

In operation, substrate waveguide 40 advantageously receives light from image source 20 provided through collimating optics 30 at an input 72 and provides light to a user at its output 74. Image source 20 provides information using a single color of light (e.g., green light with a wavelength approximately between 500 and 550 nanometers (nm)). Light provided to substrate waveguide 40 is preferably linearly S polarized and collimated. Alternatively, other polarization, multiple colors, or other colors at different wavelengths can be utilized without departing from the scope of the invention.

Substrate waveguide 40 preferably performs two operations in one embodiment. First, substrate waveguide 40 is disposed to provide a medium for transporting light by total internal reflection from input 72 to output 74. Light is reflected multiple times off of opposing main sides 84 and 88 of substrate 40 as it travels from input 72 to output 74. Second, substrate waveguide 40 operates as a combiner allowing the user to view the light from image source 20 at output 74 and light from the real world scene through sides 84 and 88.

Light from collimating optics 30 first strikes diffraction grating 42 at input 72 on side 84 of substrate waveguide 40. Grating 40 diffracts light toward the length of substrate 40 so that it travels by total internal reflection to output 74. At output 74, diffraction grating 44 disposed on side 88 diffracts the light toward the user and out of the substrate waveguide 40. Diffraction grating 42 at input 72 preferably has a greater efficiency than diffraction grating 44 at output 74 in one embodiment. In one example, grating 42 has an efficiency of as high as possible (e.g., 50 percent or greater) and grating 44 has an efficiency low enough to provide a uniform image across output 74.

In one embodiment, grating 42 is a reflective grating disposed on side 84 and grating 44 is a reflective grating disposed on side 88. Gratings 42 and 44 can be reflective or transmissive and disposed on either of sides 84 and 88 depending on design configurations.

Advantageously, system 10 includes a plate 110 in one embodiment. Plate 110 is disposed over an area associated with diffraction grating 44. Plate 110 can be attached to waveguide 40 via a spacer and an adhesive 112 such that an air gap 114 exists between grating 44 and plate 110. Plate 110 can be attached to waveguide 40 by a variety of structures including brackets, fasteners, etc. without need for adhesive 112. Plate 110 is preferably transparent in one embodiment. Plate 110 can be manufactured from a number of materials including glass suitable for optical applications.

Plate 110 is advantageously employed to both protect grating 44 and to reflect transmitted orders of light as explained in more detail below with reference to FIGS. 4 and 5. Minimizing air gap 114 and sealing the perimeter of plate 110 to waveguide 40 protects grating 144 from handling damage and debris intrusion.

Plate 110 is preferably flat in one embodiment and mounted parallel to waveguide 40 (e.g., within an easily achievable tolerance). In one embodiment, plate 110 can include a reflective coating 125 on a side 118 or a side 119. Reflective coating 125 can be a multi-layer dielectric coating which has a high reflectivity for a selective wavelength, such as, a wavelength associated with green light in one embodiment. The multi-layer dielectric coating minimizes reflectance of light at other visible wavelengths. An example of materials for reflective coating 125 is a combination of high, medium and low index of refraction dielectrics such as titanium dioxide, silicon dioxide, and magnesium fluoride.

With reference to FIGS. 4 and 5, a transmitted order of diffracted light 126 is not reflected back towards the pilot by grating 42. As shown in more detail with respect to portion 150 in FIG. 5, light 120 traveling by total internal reflection within waveguide 40 strikes diffractive grating 44 and transmitted order of light 126 travels through air gap 114 and strikes plate 110. Plate 110 with coating 125 reflects light 126 as light 128 which travels through diffraction grating 44 and out of substrate waveguide 40 as light 122. Light 134 reflected by grating 44 exits waveguide 40 as light 124. In this way, system 10 advantageously recovers transmitted order of light 126 to increase the optical efficiency of HUD system 10.

Reflective coating 125 prevents light from the real world from being reflected due to its color selectivity in one embodiment. Similarly, in another embodiment coating 125 can be configured to reflect light from the entire visible spectrum if seeing through combiner 40 at the location of grating 44 is not necessary.

With reference to FIG. 2, gratings 42 and 44 are preferably implemented as surface relief gratings in a high refractive index (e.g., n is greater than or equal to 1.5) dielectric materials, thereby enabling wider field of view with acceptable luminance. Gratings 42 and 44 can be implemented according to a number of techniques as discussed below. In one embodiment, gratings 42 and 44 are surface relief gratings fabricated using lithographic mastering in a wafer foundry. In the alternative embodiment, other types of gratings, reflective or transmissive, can be used.

Substrate waveguide 40 can be a single glass plate 78 or can be made from two or more fixed glass plates. Substrate waveguide 40 can have a variety of shapes including generally rectangular, oval, circular, tear drop-shaped, hexagonal, rectangular with rounded corners, square-shaped, etc.

Gratings 42 and 44 preferably have a period of 330 nm (plus or minus 20 percent) nanometers. Grating 42 preferably has a trench depth of 100-150 nm, and grating 44 has a trench depth of 50-100 nm in one embodiment. Both gratings 44 and 42 preferably have a 40-70% duty cycle.

It is understood that while the detailed drawings, specific examples, material types, thicknesses, dimensions, and particular values given provide one exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Various changes may be made to the details disclosed without departing from the spirit of the invention which is defined by the following claim.

What is claimed is:

1. A head up display comprising:
a substrate waveguide, configured for use as a combiner, the substrate waveguide receiving collimated light at an input and providing the collimated light to an output, the collimated light traveling from the input to the output within the substrate waveguide by total internal reflection, wherein an input diffraction grating is disposed in a first area at the input and an output diffraction grating is disposed in a second area at the output; and
a plate covering at least a portion of the second area, wherein the output diffraction grating is disposed parallel to a face of the substrate waveguide at the second area, wherein the plate is disposed parallel to the output diffraction grating.

2. The head up display of claim 1, wherein the waveguide provides pupil expansion.

3. The head up display of claim 2, wherein the output diffraction grating is a reflective grating.

4. The head up display of claim 3, wherein the plate is a transmitted order recovery reflector for the output diffraction grating.

5. The head up display of claim 4, wherein the plate is flat and parallel with respect to the substrate waveguide.

6. The head up display of claim 5, wherein a gap is between the waveguide and the plate.

7. The head up display of claim 6, wherein the plate is sealed with respect to the waveguide.

8. The head up display of claim 1, wherein the plate includes multilayer dielectric coatings having a high reflectivity range for a range of wavelengths, the range of wavelengths being less than the total range for visible light.

9. The head up display of claim 8, wherein the range of wavelengths is restricted to a wavelength range for green light.

10. A method of providing information to a user, the method comprising:
providing light from an image source to a collimator;
providing the light from the collimator to a combiner, the light traveling from an input of the combiner to an output of the combiner by total internal reflection, wherein an input diffraction grating is disposed in a first area at the input and an output diffraction grating is disposed in a second area at the output; and
reflecting light transmitted through the output diffraction grating to a position outside of the combiner with a component protecting the output diffraction grating, wherein the light transmitted through the output diffraction grating to the position is reflected through the combiner toward the user, wherein the output grating is disposed parallel to a main surface of the combiner.

11. The method of claim 10, wherein the light transmitted through the output diffraction grating is a transmitted order.

12. The method of claim 10, wherein the reflecting step uses a cover glass disposed over the second area of the cover glass.

13. The method of claim 12, wherein a gap is disposed between the cover glass and combiner.

14. The method of claim 10, wherein a pupil at the output is expanded at least by a factor of four with respect to a pupil at the input.

15. A display for providing an image, the display comprising:
an image source;
collimating optics for receiving the image from the image source;
a combiner receiving collimated light from the collimating optics at an input and providing the collimated light to an output, the collimated light traveling from the input to the output within the combiner by total internal reflection, wherein an input diffraction grating is disposed at the input and an output diffraction grating is disposed at the output, wherein the output diffraction grating is disposed parallel to a main surface of the combiner associated with the output; and
a means for recovering transmitted order light from the output diffraction grating and protecting the output diffraction grating.

16. The display of claim 15, wherein the means for recovering is a plate having at least one reflective coating.

17. The system of claim 16, wherein the plate is disposed in parallel with the combiner.

18. The system of claim 17, wherein the combiner is a substrate waveguide and the input gratings and output gratings are reflective surface relief diffraction gratings.

19. The system of claim 15, wherein the combiner provides pupil expansion.

20. The system of claim 19, wherein the collimating optics are arranged as a catadioptric collimator.

* * * * *